June 18, 1968     R. L. LARSON     3,388,626
APPARATUS FOR INTERMITTENTLY SHREDDING PLASTIC SHEET SELVAGES
Filed Sept. 10, 1965
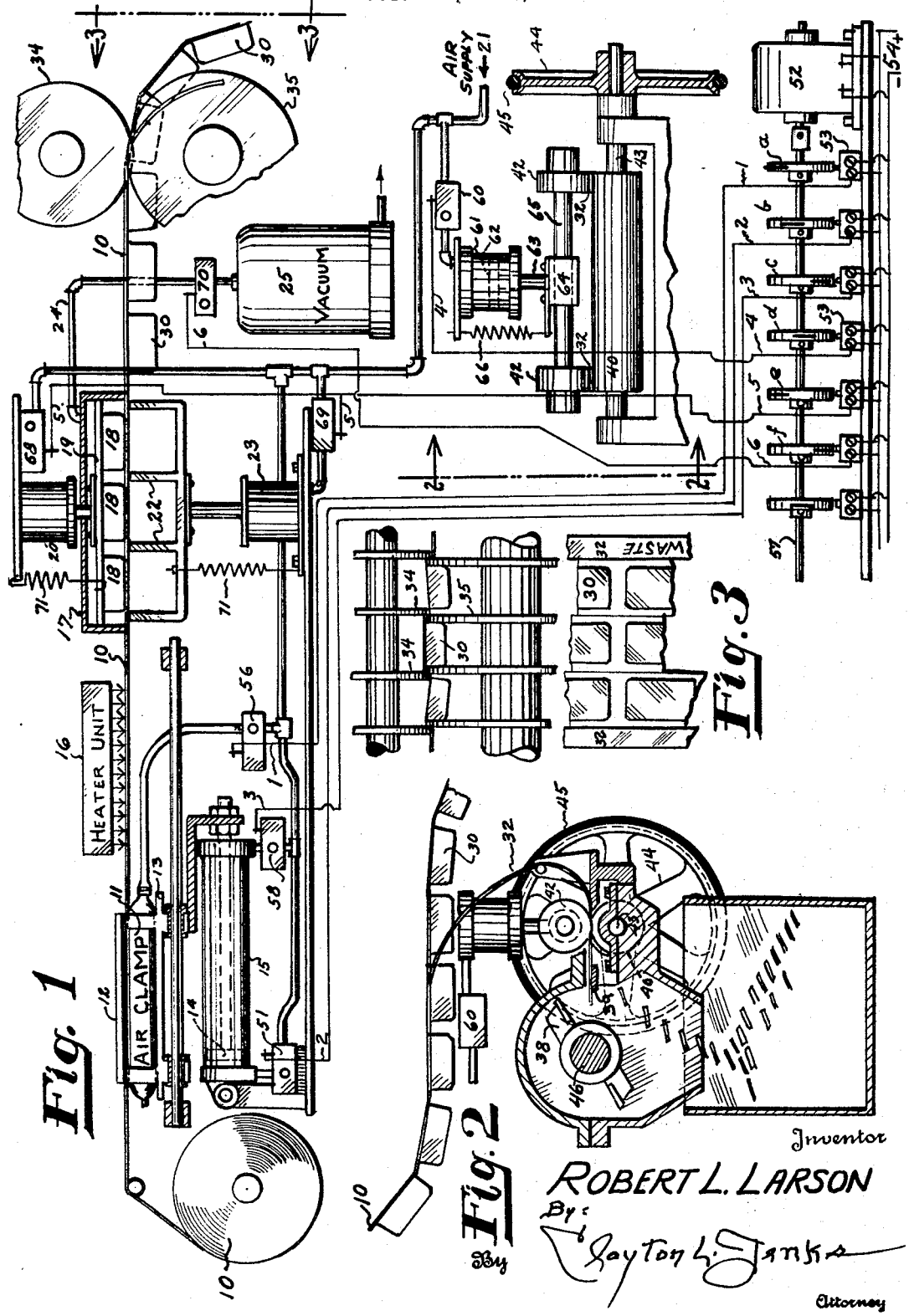
Inventor
ROBERT L. LARSON
By:
Clayton L. Jenks
Attorney

3,388,626
APPARATUS FOR INTERMITTENTLY SHREDDING PLASTIC SHEET SELVAGES
Robert L. Larson, Auburn, Mass., assignor to Parker Metal Goods Company, Worcester, Mass., a corporation of Massachusetts
Filed Sept. 10, 1965, Ser. No. 486,466
5 Claims. (Cl. 83—261)

This invention relates to apparatus for removing the selvages from the sides of a molded strip and shredding the selvages.

The molding of various shapes, such as a blister for packaging small merchandise, is necessarily intermittent, so that the film sheet may be stationary during the molding operation. Hence, it has been customary to remove the selvages from the molded sheet and thereafter cut them up in a separate operation.

The primary object of my invention is to provide apparatus which will shred or cut the selvage strips as they flow from the molding machine and to coordinate the feed of the strips to the cutter with the intermittent feed of the film sheet to the molding apparatus.

Referring to the drawings, one embodiment of an apparatus capable of satisfying the above object is illustrated diagrammatically and in which:

FIG. 1 is a diagrammatic view showing the sequence and relationship of the feeding operations:

FIG. 2 is a side view on the line 2—2 of FIG. 1 which shows the feed of the selvage to the cutters; and FIG. 3 is a fragmentary end elevation on the line 3—3 of FIG. 1 showing the relation of the cutter to the molded film sheet and the selvages.

One standard form of apparatus used for molding merchandise packaging blisters is shown diagrammatically at the upper left in FIG. 1. It comprises a reel of film sheet 10 of suitable material, such as a polybutyrate, which is fed forward intermittently by a reciprocating air clamp. This clamp comprises an expandable rubber bag 11 suitably connected through a flexible hose line with a supply of compressed air. The film sheet is located between that bag and a flat surfaced top plate 12 which is connected to a lower flat plate 13 beneath the bag. When the bag is inflated, the film sheet is clamped against the upper plate 12 and forced to move therewith in a reciprocatory motion. This motion is provided by a hydraulic mechanism supplied preferably with compressed air from the main air supply 21. When the compressed air is admitted to the left of the piston 14 in the cylinder 15, the piston which is connected to the plates 12 and 13 causes reciprocation of the air clamp mechanism toward the right. A reverse motion is provided by admitting air to the right side of the piston 14 after the bag has been deflated and releases the sheet. The sheet 10 is thus moved intermittently toward the right and beneath a suitable heater unit 16 which brings the plastic sheet to a moldable temperature.

The next intermittent step of film movement brings the sheet into the molding apparatus 17 beneath the vertically reciprocable molds 18 of suitable shape which depend from a plate 19. The molds are periodically reciprocated by a suitable piston in the hydraulic piston chamber 20. Coordinated with the mold movement is the vertical movement of a frame 22 provided by another piston mechanism 23. That frame moves to seal the sheet 10 against the under side of the upper plate 19. A vacuum is applied to the interior of the molding apparatus by means of a pipe 24 connected with the vacuum tank 25, and the parts are so arranged and operated that the film sheet is drawn upwardly against the molds 18 to form the so-called blisters 30 used for packaging merchandise. All of the above described mechanisms may be a suitable or standard apparatus.

A plurality of laterally and longitudinally spaced blisters 30 are thus formed while the film sheet is stationary. The next step is to slit the film sheet longitudinally and remove the waste selvages 32 and at the same time separate the rows of blisters for further treatment. To this end, the film with its depending blisters is fed to a gang of power driven, disk shaped, rotary cutters 34 and 35 (FIG. 3) which slit the sheet and separate the selvages from the molded blisters. The cutters 34 and 35 may be of any suitable standard construction for shearing off the selvages 32. The selvages are fed into two film choppers, one of which is shown in FIG. 2. The chopper or shredder, which may be of suitable construction, comprises power driven revolving blades 38 arranged to cooperate with a stationary cutter blade 39 to cut the film selvage into short segments as the selvage is fed forward thereto.

As above indicated, the primary object of this invention is to feed the selvages 32 into the path of the continuously revolving cutters 38 only while the film sheet is being moved forward by the air clamp mechanism, and that forward feeding of the selvages must be at the same rate as that of the forward sheet movement. This forward feed of the selvages is accomplished by means of a power driven roll 40, or a pair of rolls, arranged to cooperate with upper idler rolls 42, and between which each selvage 32 is fed. The axle 43 of the lower roll 40 is driven by a suitably mounted large wheel 44 which has a solid rubber tire 45 fixed on its periphery and arranged to frictionally engage the power driven shaft 46 of the cutter (FIG. 2) or a suitable drive wheel thereon, whereby the high speed cutter shaft 46 serves to drive the roll 40 at a comparatively slow rate. Other suitable driving mechanisms may be employed to operate that drive roll 40.

The feed roll 42 is moved to and from operative engagement with the drive roll 40 to effect an intermittent feed of the selvage. A synchronous timing of the feed roll drive with the forward movement of the sheet 10 by the air clamp mechanism is preferably accomplished by means of a set of power driven cams, shown at the lower right in FIG. 1, arranged to operate micro-switches 53 which electrically control certain valves governing the feed mechanisms. The cams which may be adjustable, are suitably mounted on and driven by a cam shaft 57 rotated at a required rate by means of an electric motor 52. The micro-switches 53 are so mounted and arranged and the cams are so shaped that they provide the required sequence of events.

The motor 52 and the micro-switches are each connected to a suitable power line 54. The lead line 1 connected with the first micro-switch governed by the first cam $a$ serves to connect the power line with a suitable solenoid controlled valve 56 which serves when the switch is closed to open the valve and admit compressed air from the air supply 21 to the air clamp bag 11. That first stage operation causes the air clamp to engage the film sheet and clamp it against the upper reciprocable plate 12. The second cam $b$ operates its associated micro-switch to send current through the electric line 2 to the solenoid operated valve 51. Opening this valve causes compressed air from the supply pipe 21 to issue into the piston chamber at the left of the piston 14, which causes the air clamp and associated parts to move toward the right and carry the film sheet therewith to the heater zone beneath the heater unit 16.

The third cam $c$ closes its micro-switch connected with line 3 to cause a solenoid operated valve 58 to open at the right time after the sheet 10 has been molded and permit compressed air to enter the right hand side of the piston 14 in cylinder 15. At the same time, the valve 56 is opened by a suitable associated spring mechanism which permits the air clamp bag to be deflated. That is, when the cam 1 has released its micro-switch, a spring closes the valve 56 and opens an exhaust port to relieve the air pressure in the bag 11. This permits the air clamp and associated parts to move toward the left while the film sheet is free therefrom and so be ready for another clamping operation as controlled by the first cam a. Thus these first three cams control the forward movement of the film by the air clamp and cause the sheet to move intermittently and to remain stationary while the air clamp members are reciprocating toward the left.

The fourth cam d controls its micro-switch 53 to admit power through the line 4 to the solenoid operated valve 60 which is thus opened to admit air to the piston chamber 61 above the piston 62. The piston rod 63 carried by that piston 62 is connected to a sleeve 64 through which passes the axle 65 near the ends of which are mounted the two pressure rolls 42. A tension spring 66 connected between the sleeve and the stationary part of the piston casing serves to remove the pressure rolls from contact with the selvage strips 32 when the air pressure within the cylinder 61 is released. Thus, when air is admitted to the upper side of the piston 62, the rollers 42 are forced downward to clamp the selvage strips against the power driven roll 40, and move them forward. The cam d is so timed that it feeds the selvages 32 forward at exactly the same time that the air clamp is moving the film toward the right into the heating zone.

It will be understood that each solenoid controlled valve comprises an exhaust port governed by the solenoid which permits the release of air pressure when the valve is not under the influence of its associated cam. That is, cams a and b open their associated valves to cause the film to be clamped to its carriage 12, 13 followed by the reciprocation of the carriage toward the right by means of piston 14. At the same time when air is admitted to valve 51 to move the air clamp toward the right and carry the film sheet into the heater zone, the cam d causes the valve 60 to open and force the piston 62 downward to clamp the selvages against the constantly rotating roller 40. Thus each selvage is fed forward to its associated chopper (FIG. 2) only while the air clamp is moving the film sheet toward the right. It might be observed that some freedom of motion is permitted, as shown in FIG. 2 by arranging a loop in the selvage film in such a manner that small variations in the two speeds will not affect the chopper action. The periphery of the feed roll 40 is so sized and timed as to move at the rate of the air clamp reciprocation toward the right, so that the rates of movement of the film sheet and selvages are equal. Also, the idler rolls 42 move to press the selvages against the drive roll 40 at exactly the same time as that of the start of the movement of the air clamp toward the right. Hence, the selvage cannot be torn or other injury caused by a lack of synchronization. As soon as the power connection to the solenoid of valve 60 is broken, the spring 66 moves the idler roll 42 from contact with the film selvage and thus stops the film movement. It will be understood that the same chopper mechanism may be employed to cut up or shred the two selvages, or separate choppers may be employed.

The fifth cam e operates through its associated micro-switch and power circuit 5 to cause the solenoid control valve 68 to move the molds 18 down against the heated film and form the blisters. A shunt in that same line 5 causes the solenoid controlled valve 69 to open and admit air to the cylinder 23 and force the frame 22 up into clamping engagement with the underside of the mold plate 19 and thus prevent the loss of vacuum during the molding operation. Synchronized with the movements of the molds 18 and frame 22 towards the film sheet, the vacuum chamber 25 is connected with the mold chamber 17 to cause the film sheet to be molded against the underside of the molds 18. This is accomplished by the cam f which through its micro-switch and the power line 6 causes the solenoid operated valve 70 to open and provide for the exhaustion of air from the mold chamber. This is so timed that the molding operation is performed while the film sheet is stationary. Springs 71 are so connected between stationary parts and the mold members 18 and 22 as to return the latter to inoperative positions after the molding has been completed. The vacuum chamber 25 is disconnected from the mold chamber by a suitable spring associated with the controlling valve 70 when the cam f disconnects the power line from the solenoid of valve 70.

It will now be appreciated that I have provided a shredding apparatus comprising a continuously revolving cutter knife and power mechanism to feed a strip intermittently in a stop and go movement to the knife for shredding the same. Furthermore, in a plastic sheet molding apparatus which has mechanism for moving the sheet forward intermittently for the molding operation and which comprises a cutter for removing a selvage from the sheet, I have provided a shredder for chopping up that selvage as it is moved forward. The preferred construction comprises a series of cams, micro-switches and power circuits controlled by the cams which in turn govern solenoid operated apparatus for causing an intermittent movement of both the sheet and a selvage cut therefrom, so that the two move forward in synchronism and the selvage moves only simultaneously with and at the rate of sheet movement. The cams are of course so shaped and timed as to provide the required sequence of operations as above described.

It will be understood that various modifications may be made in the apparatus to satisfy the object of this invention. Hence the above description of a preferred embodiment of the invention is not to be interpreted as imposing limitation on the appended claims.

I claim:

1. Shredding apparatus comprising a continuously revolving cutter knife and an associated stationary knife arranged to cut a plastic strip into short segments and power mechanism to feed said strip intermittently in a start and stop motion into engagement with said knives for shredding the strip, said power mechanism comprising a driven roll, a pressure roll movable toward and from the driven roll which causes the strip to be fed to the knives, a cam, a micro-switch and an associated power circuit governed by the cam and mechanism governed by said circuit which moves said pressure roll and causes the strip to be fed to the knives intermittently.

2. In association with a plastic sheet molding apparatus having mechanism for moving a longitudinally extended sheet forward into an operating zone and there holding it stationary and thereafter moving said sheet to present a new section in said zone, mechanism for shaping said sheet while it is stationary in said zone, and a cutter for separating a selvage from the said moving sheet, shredding mechanism comprising a continuously revolving knife for chopping the selvage into segments, selvage feed mechanism for feeding the selvage to the knife and power actuated means which causes said feed mechanism to move the selvage intermittently in synchronism with the rate of movement of the sheet, so that the selvage moves only simultaneously with and at the rate of sheet movement.

3. Apparatus according to claim 2 in which said power actuated means comprises a power driven roll, a pressure roll intermittently movable to cooperate with said driven roll to feed the selvage to the knife, a set of cams, micro-switches controlled by said cams and associated means governed by said switches which causes the pressure roll to move toward and from the driven roll to feed the selvage forward intermittently.

4. In association with a plastic sheet molding apparatus having mechanism for moving a single continuous plastic sheet progressively into a forming zone and there holding it stationary for forming operation and again moving the sheet forward to present another section in the forming zone, a shredder comprising, cutter means for separating a selvage from the sheet, a chopper for shredding the selvage, feed mechanism for gripping and feeding the selvage to the chopper and a time controlled means for causing said feed mechanism to move the selvage forward to the chopper only when said sheet is moving forward, so that the selvage and sheet movement are coordinated in a timed relationship and the selvage moves at the same rate as and only at the time of said sheet movement.

5. In association with a plastic sheet molding apparatus having a hydraulically operated gripper for said sheet, hydraulic means to move the gripper to advance the sheet for a molding operation and a cutter for separating a selvage from the sheet, mechanism comprising a chopper for shredding the selvage, a driven roll and a movable pressure roll for feeding the selvage to the chopper, hydraulic mechanism for moving the pressure roll relative to the driven roll, a set of driven cams, micro-switches controlled by said cams and associated power circuits, means including solenoid operated valves governed by certain of said circuits which causes said hydraulic means to move the sheet forward intermittently, and means including solenoid operated valves governed by other of said circuits which causes said hydraulic mechanism to move the pressure roll and cause the selvage to be fed to the chopper, said cams being coordinated to cause the forward movement of the selvage at the same rate as and only at the time of said sheet movement.

References Cited
UNITED STATES PATENTS

| | | | |
|---|---|---|---|
| 2,251,312 | 8/1941 | Yoder | 83—923 X |
| 2,786,527 | 3/1957 | Bruns | 83—923 X |
| 3,060,778 | 10/1962 | Karber | 83—923 X |
| 3,185,006 | 5/1965 | Mercer et al. | 83—408 X |
| 3,246,553 | 4/1966 | O'Brien | 83—408 |

WILLIAM S. LAWSON, *Primary Examiner.*